Figure 6:
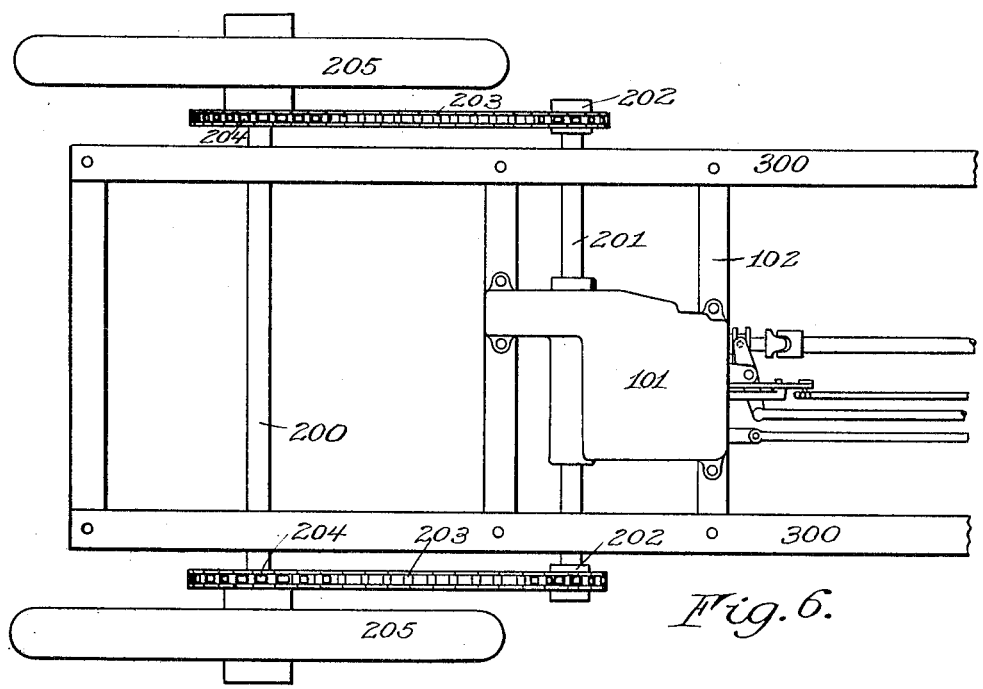

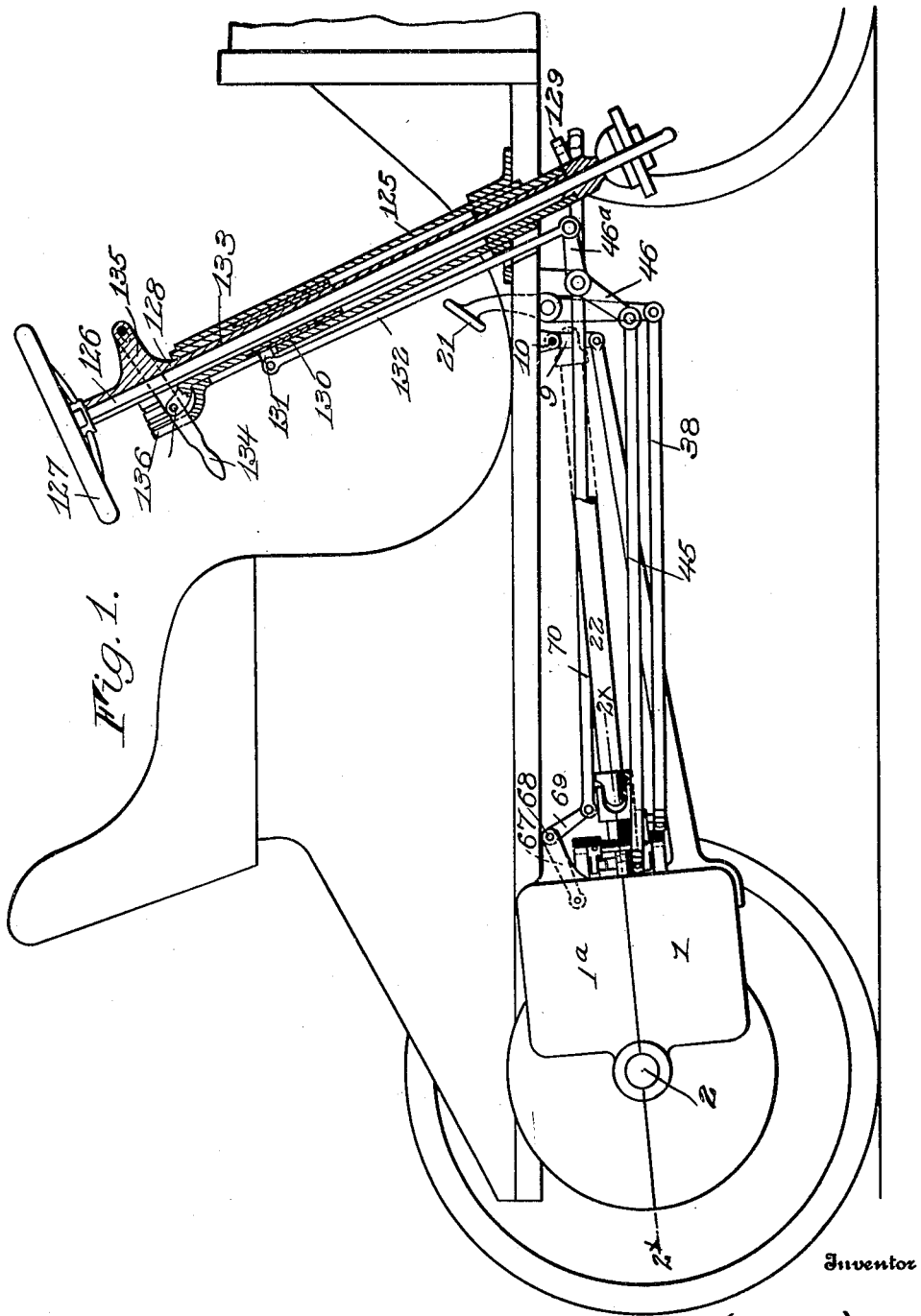

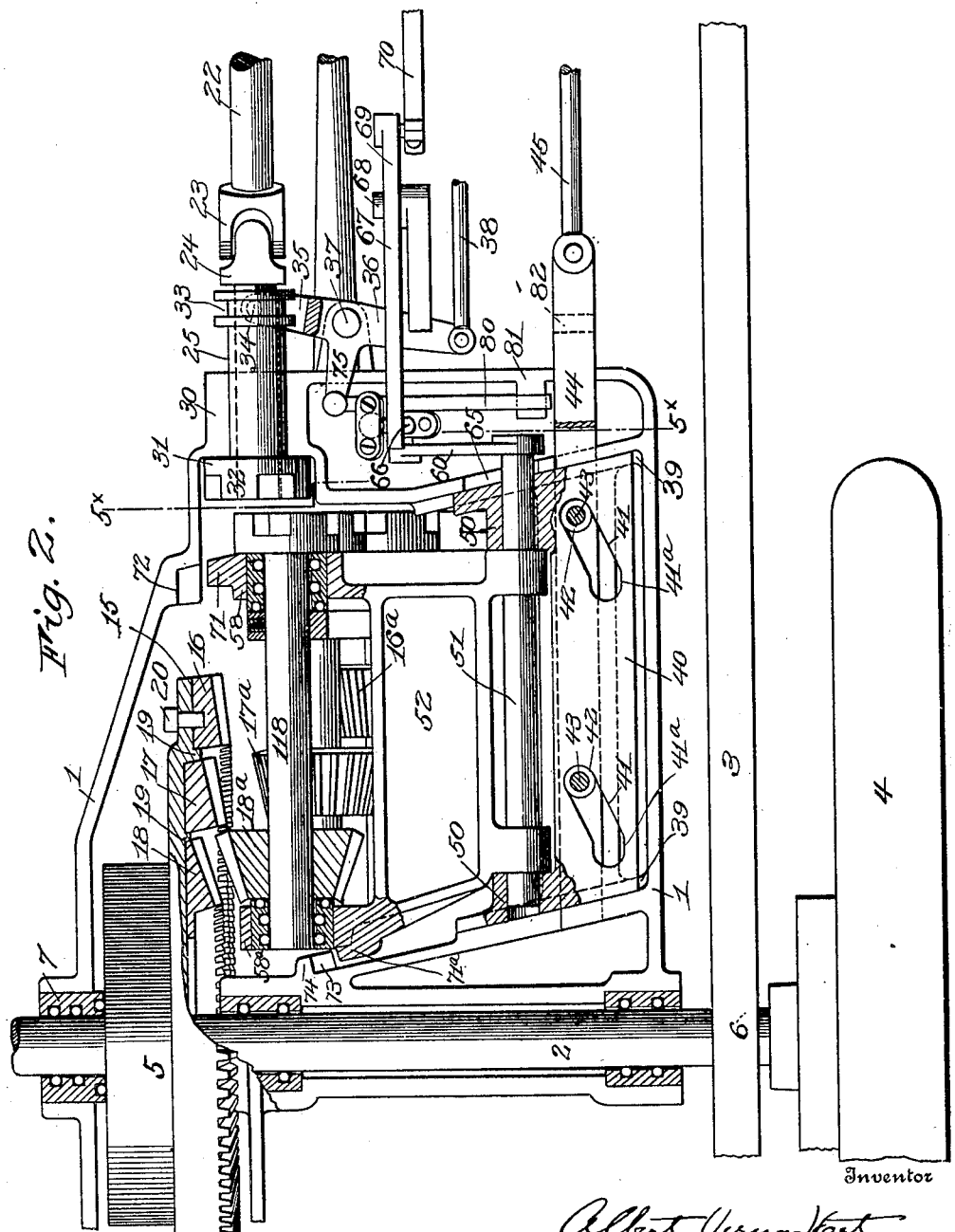

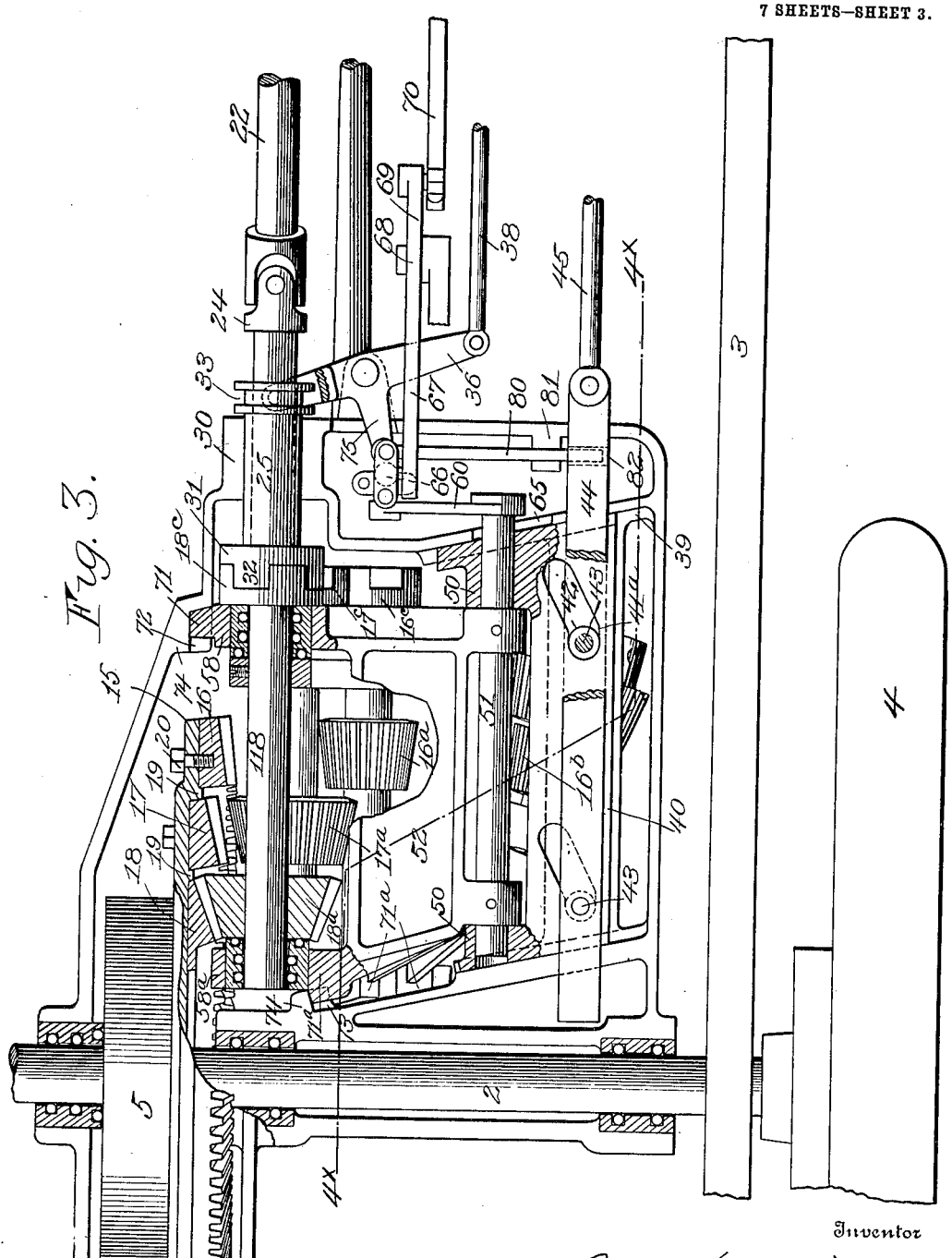

No. 843,205. PATENTED FEB. 5, 1907.
A. V. HART.
VARIABLE SPEED TRANSMISSION MECHANISM.
APPLICATION FILED JAN. 19, 1906.
7 SHEETS—SHEET 4.
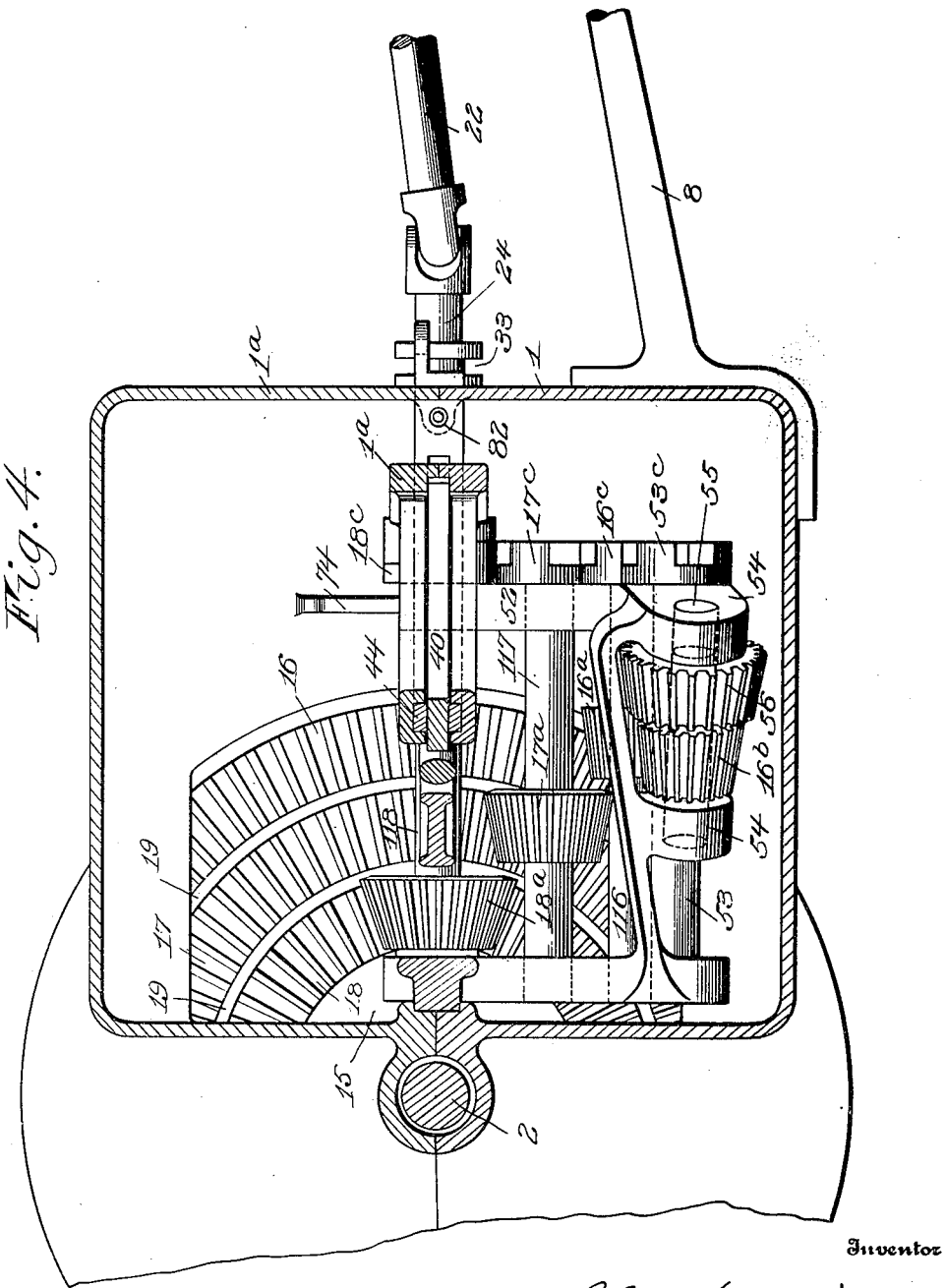

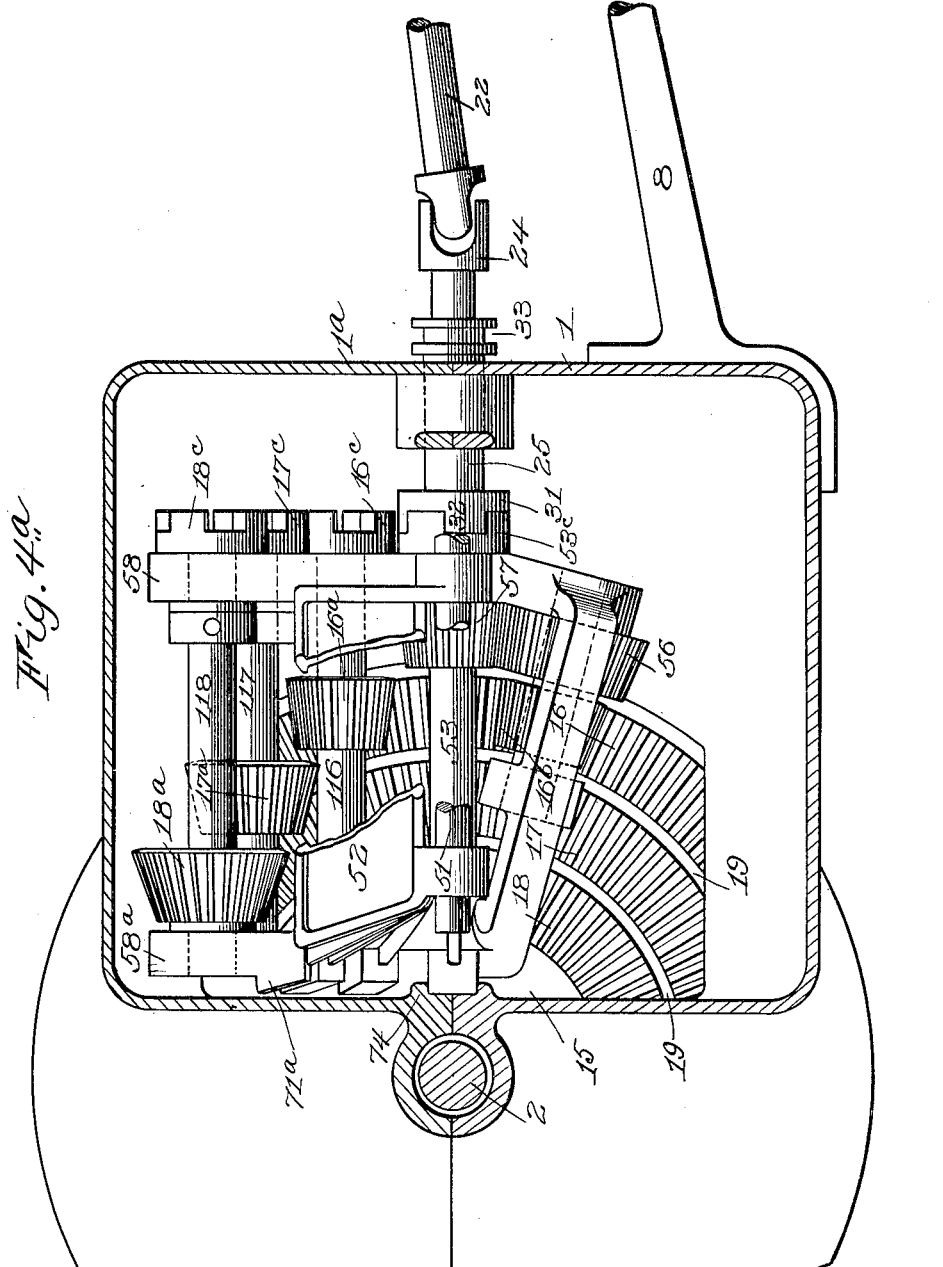

No. 843,205. PATENTED FEB. 5, 1907.
A. V. HART.
VARIABLE SPEED TRANSMISSION MECHANISM.
APPLICATION FILED JAN. 19, 1906.
7 SHEETS—SHEET 6.
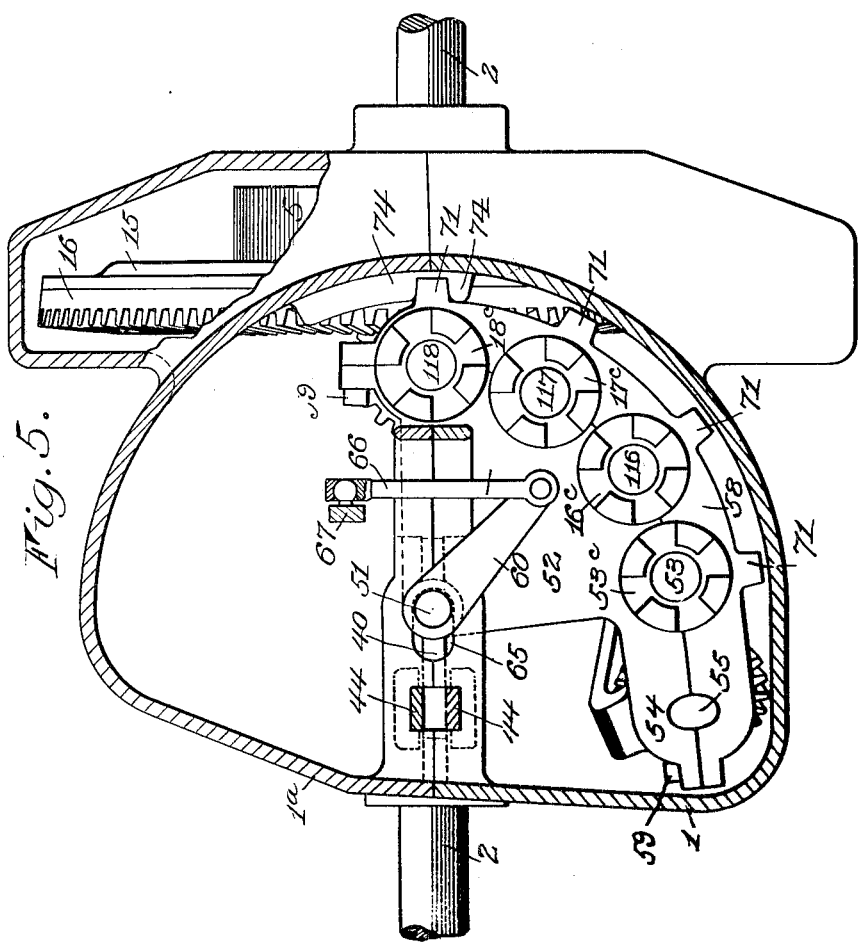

No. 843,205. PATENTED FEB. 5, 1907.
A. V. HART.
VARIABLE SPEED TRANSMISSION MECHANISM.
APPLICATION FILED JAN. 19, 1906.

7 SHEETS—SHEET 7.

UNITED STATES PATENT OFFICE.

ALBERT VERNON HART, OF ROCHESTER, NEW YORK.

VARIABLE-SPEED TRANSMISSION MECHANISM.

No. 843,295.

Specification of Letters Patent.

Patented Feb. 5, 1907.

Application filed January 19, 1906. Serial No. 296,783.

*To all whom it may concern:*

Be it known that I, ALBERT VERNON HART, of Rochester, in the county of Monroe and State of New York, have invented certain new and useful Improvements in Variable-Speed Transmission Mechanism; and I do hereby declare the following to be a full, clear, and exact description of the same, reference being had to the accompanying drawings, forming a part of the specification, and to the reference-numerals marked thereon.

My present invention relates to power-transmission devices; and it has for its object to provide a mechanism by means of which the speed of a driven member may be regulated relatively to the rate of rotation of the motor or driving devices.

My invention has for its further object to provide such a mechanism which is capable of adjustment to operate at high, low, or intermediate speeds and in reverse direction, comprising generally parts which may be brought separately into operative position and are so arranged that each of them constitutes a direct connection between the driving and driven members.

To these and other ends the invention consists in certain improvements and combinations of parts, all as will be hereinafter more fully described, the novel features being pointed out in the claims at the end of the specification.

In the drawings, Figure 1 is a side elevation showing mechanism constructed in accordance with my invention as it appears when applied to a motor-vehicle, together with the adjusting devices for controlling its various parts. Fig. 2 is an enlarged top plan view, partly in section, taken on the line 2× 2× of Fig. 1, the top section of the casing being removed, showing the high-speed connecting element in inoperative position. Fig. 3 is a similar view showing the parts in operative position and the driving and driven members connected through the high-speed element. Fig. 4 is a vertical sectional view taken on the line 4× 4× of Fig. 3. Fig. 4ª is a similar view showing the reverse pinion in operative position. Fig. 5 is a vertical sectional view taken on the line 5× 5× of Fig. 2. Fig. 6 is a top plan view showing a modified form of the application of the mechanism to a vehicle.

Similar reference-numerals in the several figures indicate similar parts.
A power transmission embodying my invention is adapted to be employed upon any form of machine where it is desired primarily to vary the speed of a driven member to various degrees relative to the motor or source of power; but in order to show a practical application of the mechanism embodying my invention I have shown it applied to a motor-vehicle for transmitting the power from the motor or engine to the driving-wheels to adjustably control the speed of the vehicle. In illustrating this adaptation of the device I have shown the mechanism as located within a frame consisting of a casing or housing comprising a lower closed section 1 and a top part 1ª, arranged upon the driving-axle 2, which is connected in any desired manner to the chassis or frame 3 of the vehicle. The ends of the separate sections of the axle 2 are connected, as usual, to the wheels 4, and their independent movement is permitted by means of the usual or any preferred form of differential-gearing devices 5, arranged between the proximate ends of the separate sections of the shaft 2, as will be understood. The sections of the shafts are supported in bearings 6 in the frame or casing, and the latter is attached to the frame of the vehicle and retained in an intermediate position by the tubular sleeves 7, its forward end being supported by a strut or tie-rod 8, connected by a knuckle or joint 9 with a cross-bar 10 on the frame 3.

The driven member of the mechanism is a bevel gear-wheel, secured to one of the sections of the shaft 2, preferably comprising a face-plate 15, provided with a plurality of concentric rings 16, 17, and 18 of different diameters and provided with gear-teeth on their side faces which are cut on different pitches, for a purpose more fully appearing hereinafter. The rings constitute separate gear-wheels, and each of them is centered upon an annular shoulder 19 and is detachably connected to the face-plate 15 by bolts or other securing devices 20, whereby they may be easily removed to facilitate repair in case of accident or to permit them to be replaced when they become worn or otherwise injured.
The motor or engine (not shown, but located at the forward end of the frame 3) is connected to the driving-shaft 22, which extends rearwardly and is connected by a universally-movable joint 23 with the section 24, on which is mounted the longitudinally-movable sleeve 25, supported in the bearing 30 at the forward end of the frame or housing and arranged in the plane of the axis of the driven member 15. The inner end of the sleeve is provided with the clutch member 31, provided with the outwardly-projecting teeth 32, and at the rear end of the sleeve are annular flanges or collars, which are spaced to provide a channel 33, into which extend pins 34, located in the extremities of the bifurcated end 35 on the clutch-operating lever 36, pivoted to the forward end of the frame or housing, as indicated at 37. The outer end of the lever 36 is connected to a rod 38, attached to a suitable operating device, such as a treadle 21, supported on the frame 3 of the vehicle and adapted to adjust the lever from the position shown in Fig. 2 to that shown in Fig. 3 to move the driven clutch member 31 into and out of operative position.

The means connecting the driving and driven members comprise generally a plurality of elements which are adjustable into and out of engagement with the driven member and are provided with means for securing them to the driving member when in operative position. In the present illustrations these elements comprise pinions mounted on separate arbors journaled in an adjustable carrier and provided with clutch members adapted to coöperate with the driving clutch member 31. The carrier is adjustably supported in proximity to the driving and driven members, and means are provided for moving it laterally relatively to the driven member and also for rotating it to position each of the pinions in axial alinement with the gear-wheel.

Arranged within the housing or casing are parallel ways or guides 39, in which is supported a movable slide 40, provided with cam-slots 41, in which rest rollers 42, supported on pins 43, extending between the longitudinally-movable adjusting-bars 44, guided in slots provided in the proximate faces of the sections 1 and 1ᵃ of the housing or casing. The forward ends of the bars are attached to a rod 45, operated by a bell-crank lever 46, pivoted on the frame 3, which is adapted to move the bars 44 inwardly from the position shown in Fig. 2 to that shown in Fig. 3 to move the slide 40 laterally in the casing toward the driven member. The outer ends of the cam-slots are extended in a direction parallel with the bars 44 to provide shoulders 41ᵃ, which prevent accidental outward movement of the slide. In order to move the connecting elements or pinions relatively to the driven member so that the inner and outer points of their teeth will be disengaged simultaneously, I arrange the guides 39 in the housing or frame at right angles to the pitch-line of the teeth of the driven member. If the latter is composed of two or more bevel gear-wheels, the guides are arranged at right angles to the mean of the pitch-lines of the several gear-wheels. At its inner side the slide 40 is recessed, providing at its ends extensions or lugs 50, in which is journaled a rock-shaft 51, rigidly attached to the adjustable quadrant-shaped frame or carrier 52, on which is journaled the arbors 116, 117, and 118, carrying, respectively, the pinions 16ᵃ, 17ᵃ, and 18ᵃ, which are adapted to coöperate at different times with the gear-wheels 16, 17, and 18, as will be further explained. Also journaled on the carrier-frame 52 is a counter-shaft 53 and adjacent thereto at one side of the frame are extensions 54, in which is journaled a shaft 55, located at an angle to the shaft 53 and adapted when the carrier is in one position of adjustment to extend radially from the center of rotation of the driven member. The shafts 53 and 55 are provided with intermeshing pinions 56 and 57, and the last-mentioned shaft is also provided with a pinion 16ᵇ, adapted to coöperate with the gear-wheel 16 when it is desired to operate the latter in a reverse direction or in a direction opposite to that transmitted to the driven member by either of the pinions 16ᵃ, 17ᵃ, or 18ᵃ. The arbors 116, 117, and 118 and the reverse counter-shaft 53 are each located equidistant from the center of rotation of the carrier-frame 52, and they are respectively provided with clutch members 16ᶜ, 17ᶜ, 18ᶜ, and 53ᶜ, each of which is in alinement with the driving clutch member 31 when its corresponding connecting element or pinion is in operative engagement with the driven member. In order to facilitate assembling the various arbors on the carrier-frame 52, the end portions of the latter are divided upon arcs passing centrally through each of them, making the removable outer sections or caps 58 and 58ᵃ, which are secured by bolts 59.

The carrier-frame 52 is rocked to bring one or another of the pinions 16ᵇ, 16ᵃ, 17ᵃ, or 18ᵃ into alinement with their respective gear-wheels by means of an arm 60, attached to the forward end of the shaft 51, which projects through an aperture 65 in one of the guides 39, as shown in Figs. 2 and 3. This arm 60 is operated vertically by a rod 66, connected to the arm 67 of a bell-crank lever pivoted at 68, the other arm 69 of said lever being connected by a rod 70, adjusted by means to be presently described, which are preferably located in proximity to the operating devices attached to the rods 38 and 45. In order to prevent the rocking movement of the carrier-frame when one or another of the several pinions is in operative engagement with its gear-wheel of the driven member and also to rigidly support it, I employ projections on the frame 1, which interlock with other projections on the edge of the carrier.

The bearing cap-pieces 58 58ª are provided with radially-extending teeth or projections 71 71ª, located in alinement with the arbors 53, 116, 117, and 118, which are adapted to interlock with the recesses 72 and 73, provided in shoulders 74 in the housing or frame 1, when said carrier-frame is shifted laterally by the operation of the bars 44 to secure the carrier-frame and rigidly support each arbor when in operative position. To accurately center the carrier with each one of the pinions in alinement with its gear-wheel, the faces of the shoulder 74 are extended at one side of the apertures 72 and 73 a distance nearly equal to the distance between the teeth 71 to form bearing-surfaces, against which the ends of the teeth or projections will engage if an operator inadvertently attempts to shift the carrier-frame before the selected pinion has been adjusted to the proper position.

Inasmuch as the carrier-frame cannot be shifted or adjusted when any one of the clutch members thereon is in engagement with the driving-clutch member, I have provided means whereby the operator must positively disengage the latter before the carrier-frame is released. To this end the clutch-operating lever 36 has an arm or extension 75 projecting into the housing or casing, which is pivotally connected to a locking rod or pin 80, having its extremity guided in a boss 81 and adapted to coöperate with a recess 82, formed in the outer ends of the bars 44, said aperture being so arranged that it is in alinement with the locking rod or pin when the slide 40 is adjusted inwardly to its limit of movement to permit a movement of the lever 36 and allow the clutch member 31 to be actuated into operative position. From the foregoing it will also be seen that when the parts are in operative position the bars 44 cannot be withdrawn and the carrier-frame shifted until the clutch-operating lever 36 has been moved to the position shown in Fig. 2 to completely disengage the clutch member from its coöperating member.

The devices for adjusting the driving-clutch member and those for shifting the carrier laterally and rotating it may be conveniently located in proximity to each other. When the transmission mechanism is located upon a motor-vehicle, the parts employed for adjusting the carrier-frame may be supported on the steering-head, as shown in Fig. 1. In the present illustration of this portion of the invention, 125 indicates the tubular column containing the steering-rod 126, carrying the hand-wheel 127 and connected to the steering-wheels of the vehicle, as will be understood. The rod 126 is journaled in a sheath 128, journaled within the column, having at its lower end an arm 129, connected to the carrier shifting-rod 70. Also located within the column and guided on the sheath is a longitudinally-movable block 130, having an outwardly-projecting finger 131, connected by the rod 132 to the arm 46ª of the bell-crank lever 46. The block is revolubly connected to a movable sleeve 133, attached to a lever 134, pivoted on an arm 135, projecting forwardly from the upper end of the sheath 128 a short distance below the steering-wheel 127. The sheath is adapted to be rotated by a lateral movement of the lever 134 when the latter is in elevated position, and in order to lock it in adjusted position the upper end of the column 125 is provided with a head having a plurality of notches 136, with which the lever engages. These notches correspond to the various positions of adjustment of the carrier, there being one for each of the high, low, and intermediate speeds and the reverse, each of which is of a depth sufficient to require the lever to be operated the distance necessary to effect a lateral movement of the carrier relatively to the driven member before the sheath can be rotated to rock said carrier. Further, these notches are spaced relatively to each other so that when the lever 134 is in alinement with any one of them the carrier will be positioned with its corresponding connecting element or pinion in alinement with the driven member.

The foregoing description has been confined particularly to an arrangement of the parts of a vehicle in which the driven gear-wheels are located upon one of the sections of the driven shaft or rear axle; but as they may be employed as an intermediate connection between said axle and the engine or motor I have shown in Fig. 6 a modification of the parts. In this view the rear axle is indicated by 200, and the variable-speed driving mechanism is shown as operating a shaft 201, supported in bearings on the frame 300 and provided with sprocket-wheels 202, connected by chains 203 with the sprocket-wheels 204, provided on the wheels 205 of the vehicle. When this arrangement of the parts is employed, the shaft 201 is preferably made in two sections, which are connected by differential gearing, as will be understood, and the housing or casing 101 is supported rigidly by arms or brackets 102, attached to the frame 300.

The operation of the device will now be readily understood. Assuming the connecting elements or pinions to be disconnected, as shown in Fig. 2, the operator may rock or rotate the carrier-frame 52 to the desired position by a lateral adjustment of the lever 134, and if it is desired to connect the parts on the high speed the lever 134 will be alined with the corresponding notch 136 to arrest the carrier in the position shown in Fig. 2. A downward movement of the lever will operate the connected parts to the position shown in Fig. 1, actuating the carrier in a lateral direction to move the pinion 18ª into engagement with its corresponding gear-wheel or ring 18, as shown in Fig. 3. The rotary and lateral movement of the carrier also alines the arbor 118 with the driving-shaft and the rearward movement of the bars 44, which operates the carrier laterally, releases the locking-pin 80, when the aperture 82 registers therewith, permitting the driving-clutch member to be moved into engagement with the coöperating member 18$^c$ by a movement of the operating device or treadle 21. When it is desired to change the speed of rotation of the driven member, the clutch member 31 is first disengaged, thus retracting the locking rod or pin 80 and permitting the bars 44 to be drawn outwardly to move the carrier-frame 52 to the position shown in Fig. 2, retracting the locking teeth or projections 71 71$^a$ from engagement with their coöperating recesses in the frame or housing. The operator may then adjust the lever 134 to rotate the shaft 51 and rock the carrier-frame 52 upwardly or downwardly to adjust either the pinions 16$^a$ or 17$^a$ into alinement with the gear-wheels 16 and 17 to operate the driven member in a forward direction on either the high or intermediate speeds. If it is desired to reverse the direction of the movement of the driven member, the carrier-frame may be rocked until the axis of the shaft 55 intersects the axis of the gear-wheel 16, when by a lateral movement of the carrier-frame, as before described, the pinion 16$^b$ may be engaged with the gear-wheel 16 and the counter-shaft 53 positioned in alinement with the driving-clutch 31. The latter may be subsequently engaged with the clutch member 53$^c$, and as the counter-shaft 53 is geared to the arbor 55 by the pinions 56 and 57 the arbor 55 will be rotated in a direction opposed to the movement of the shaft 53 and the driven member will be rotated by the pinion 16$^b$ in a reverse direction to that imparted to it by any of the other pinions.

By constructing the gear-wheels of the driven member of different sizes they may be provided with teeth of different pitch, enabling the coöperating pinions to be graduated in diameter and those of the intermediate and low speeds to be made successively smaller than the high-speed pinion, so that a considerable variation may be obtained between the highest and lowest speeds. If desired, the gear-wheel 56 may be made smaller than the gear-wheel 57, so that the driven member may be operated in reverse at a lower rate of speed than when driven ahead by the low-speed pinion.

It will be seen from the arrangement of the parts shown and described that when the driven member is being operated on any of the three speeds ahead only the operative pinion is being revolved, which enables the mechanism to operate without noise. It will also be seen that the means of supporting the connecting elements, comprising a laterally-movable carrier, permits them to be disengaged from the driven member, so that the latter may be revolved independently of the driving devices. This is an advantageous feature in the mechanism, as the connecting devices may be disengaged and the driven member operated at certain times by its momentum. For instance, when the mechanism is applied to a motor-vehicle the latter may be allowed to coast without impedance by the engagement of one or another of the small pinions, and when it is desired to set the devices for a certain speed or to alter them to change the speed only the selected pinion is moved into engagement with a gear-wheel.

In adjusting the parts from one speed to another the driving devices must be disconnected, thus reducing the liability of stripping the gear wheels or pinions. A further advantage is obtained by employing a plurality of gear-wheels on the driven member and separate pinions which coöperate independently therewith, as an injury to a member of one set willl not disable the others.

I claim as my invention—

1. A power-transmission mechanism comprising a driving member, a driven member and a connecting element, means for positioning it relatively to the two members and adjusting it into operative engagement with the driven member, and an adjustable device connecting said element to the driving member.

2. A power-transmission mechanism comprising a driving member, a driven member and a connecting element, means for positioning it relatively to the driven member and operating it into engagement therewith and into alinement with the driving member and means for connecting the latter to the element.

3. A power-transmission mechanism comprising a driving member, a driven member and a connecting element, means for positioning it relatively to the two members and operating the element into engagement with one of them and in alinement with the other and devices for detachably connecting the element to said other alined member.

4. A power-transmission mechanism comprising a driving member, a driven member and a movable connecting element, means for adjusting the latter into and out of engagement with one of the members and into and out of alinement with the other member and an adjustable clutch connecting the element and said other member with which it is alined.

5. A power-transmission mechanism comprising a driving member, a driven member and a movable connecting element, means for positioning it in alinement with one of the members, separate means for moving the element laterally into and out of operative engagement with said member and means for detachably connecting said element to the other member.

6. In a power-transmission mechanism, the combination with a driving member and a driven member comprising a plurality of gear-wheels, of a plurality of connecting elements, means for adjusting them into alinement with their respective gear-wheels and moving them into and out of operative engagement therewith and adjustable clutch devices for connecting the driving member to each of said elements.

7. In a power-transmission mechanism, the combination with a driving member and a driven member comprising a plurality of gear-wheels, of a plurality of connecting elements corresponding to said gear-wheels, means for adjusting them to operatively engage one of the elements with its respective gear-wheel in alinement with the driving member and clutch devices for detachably engaging the driving member and said element.

8. In a power-transmission mechanism, the combination with a driving member and a driven member comprising a gear-wheel, of two connecting elements adapted to coöperate therewith and means for alternately adjusting them into engagement with said gear-wheel, a counter-shaft connected to one of said elements to produce a relatively reverse movement thereof and means for connecting the driving member either to the counter-shaft or the other element when said elements are respectively adjusted into operative engagement with the gear-wheel.

9. In a power-transmission mechanism, the combination with a driven member comprising a gear-wheel, of two connecting elements and means for alternately adjusting them into engagement with said gear-wheel, a clutch member carried on one of the elements, a counter-shaft also carrying a clutch member and connected to the other element to cause it to be moved in reverse direction relatively to the movement of the first-mentioned element and a driving clutch member adapted to coöperate with the corresponding clutch members of either element.

10. In a power-transmission mechanism, the combination with a driven member comprising a gear-wheel, of an arbor, a pinion thereon, and a clutch member on the arbor, a second arbor, a separate pinion thereon and a counter-shaft, gear-wheels connecting it with the last-mentioned arbor and a clutch member on the counter-shaft, means for alternately adjusting the two pinions into engagement with the gear-wheel and a driving clutch member adapted to coöperate with the corresponding clutch member of the operative pinion.

11. In a power-transmission mechanism, the combination with a driven member comprising a plurality of gear-wheels, a plurality of pinions corresponding to the several gear-wheels and an arbor supporting each pinion, of a carrier in which the arbors are mounted and means for adjusting it to engage one or another of the pinions with its respective gear-wheel, a driving member and means for connecting it to the several arbors.

12. In a power-transmission mechanism, the combination with a driven member comprising a plurality of gear-wheels, a carrier movable upon an axis extending transversely of that of the driven member, arbors journaled on the carrier and pinions arranged on the arbors corresponding to the several gear-wheels, of means for adjusting the carrier to separately engage each pinion with its respective gear-wheel, a driving member and means for connecting it to each arbor when its pinion is located in operative position.

13. In a power-transmission mechanism, the combination with a driven member comprising a plurality of gear-wheels, a movable carrier having its axis arranged in the plane of the axis of the driven member and in front of the faces of the several gear-wheels, arbors supported on the carrier and pinions on the arbor corresponding to the several gear-wheels, of means for imparting a lateral movement to the carrier and rotating it to position one or another of the pinions in alinement with its respective gear-wheel, a driving member and means for connecting it to each arbor.

14. In a power-transmission mechanism, the combination with a driven member, comprising a plurality of bevel gear-wheels, a movable carrier located in front of the faces of said gear-wheels, a pinion corresponding to each of the latter, an arbor supporting it journaled on the carrier, means for adjusting the latter, a driving member and means for connecting it to each arbor when the latter are adjusted into operative position.

15. In a power-transmission mechanism, the combination with a driven member comprising a plurality of gear-wheels, a pinion for each of the latter and an arbor for each pinion, of a pivoted carrier supporting the arbors, operating devices for rocking it and means for locking the carrier in adjusted position, a driving member and means for connecting it with each arbor.

16. In a power-transmission mechanism, the combination with a driven member comprising a plurality of gear-wheels, a pinion for each of the latter and an arbor for each pinion, of a carrier supporting the arbors, a pivot for the carrier located in rear of the arbors, devices for adjusting the carrier and means coöperating with the carrier in proximity to the arbors for locking it in adjusted position, a driving member and means for connecting it with each arbor.

17. In a power-transmission mechanism, the combination with a driven member comprising a gear-wheel, a plurality of pinions coöperating therewith and an arbor for each pinion, of a carrier supporting the arbors, means for adjusting it to position one or another of said pinions in engagement with the gear-wheel, a driving-shaft and means for connecting it to each arbor.

18. In a power-transmission mechanism, the combination with a driven member comprising a gear-wheel, a plurality of pinions coöperating therewith and an arbor for each pinion, of a pivoted carrier supporting the arbors, devices for rotating it upon its pivot, means coöperating with the carrier to lock it in adjusted position, a driving member and means for connecting it with each arbor.

19. In a power-transmission mechanism, the combination with a frame, a driven member comprising a gear-wheel, a plurality of pinions adapted to coöperate therewith, and an arbor for each pinion, of a pivoted carrier mounted on the frame and supporting the arbors, devices for rocking the carrier and means for shifting it on the frame relatively toward and from the driven member, a driving member and means for connecting it with each arbor.

20. In a power-transmission mechanism, the combination with a frame, a driven member comprising a gear-wheel, a plurality of pinions adapted to coöperate therewith, and an arbor for each pinion, of a pivoted carrier supporting the arbors, devices for rocking it, and interlocking projections on the frame and carrier, means for imparting a relative lateral movement to one of said parts to engage and disengage said projections, a driving member and means for connecting it to the arbors.

21. In a power-transmission mechanism, the combination with a frame, a driven member comprising a gear-wheel, a plurality of pinions adapted to coöperate therewith and an arbor for each pinion, of a pivoted carrier supporting the arbor devices for rocking it to position one of the pinions in alinement with the gear-wheel and means for moving the carrier laterally to adjust said pinion into operative position and projections on the carrier and frame which coöperate to lock the carrier during the operation of the pinion, a driving member and means for connecting it to the arbors.

22. In a power-transmission mechanism, the combination with a frame, a driven member comprising a gear-wheel, a plurality of pinions adapted to coöperate therewith and an arbor for each pinion, of a pivoted carrier supporting the arbor devices for rocking it to position one of the pinions in alinement with the gear-wheel and means for moving the carrier laterally to adjust said pinion into operative position, the carrier being provided with a projection for each pinion and the frame having a coöperating recess adapted to receive the projections to prevent the lateral movement of the carrier except when one of the pinions is in alinement with the gear-wheel, a driving-shaft and means for connecting it to the arbors.

23. In a power-transmission mechanism, the combination with a frame, a driven member comprising a gear-wheel, a plurality of pinions adapted to coöperate therewith and an arbor for each pinion, of a movable carrier having end portions supporting the arbors, devices for adjusting it to position a pinion in alinement with the gear-wheel, and move the pinion into operative engagement therewith, the carrier and frame being provided with interlocking projections, a driving member and means for connecting it to the arbors.

24. In a power-transmission mechanism, the combination with a frame having ways thereon, a driven member comprising a gear-wheel, a slide mounted therein and means for reciprocating it, of a carrier movably supported on the slide, arbors mounted on the carrier and pinions secured to the arbors and adapted to coöperate with the gear-wheel, and devices for adjusting the carrier, a driving member and means for connecting it to the arbors.

25. In a power-transmission mechanism, the combination with a frame having ways thereon, a driven member comprising a gear wheel, a slide mounted therein and means for reciprocating it, of a carrier movably supported on the slide, arbors mounted on the carrier and pinions secured to the arbors and adapted to coöperate with the gear-wheel, and devices for adjusting the carrier, a driving member, a clutch member thereon adapted to engage the arbors, means for operating it and a device actuated by said means for locking the slide.

26. In a power-transmission mechanism, the combination with a frame having ways thereon, a driven member comprising a gear-wheel, a slide mounted therein and means for reciprocating it, of a carrier movably supported on the slide, arbors mounted on the carrier and pinions secured to the arbors and adapted to coöperate with the gear-wheel and devices for adjusting the carrier, a driving member, a clutch member thereon adapted to engage the arbors, means for operating it and a locking device actuated by said means and coöperating with the slide-reciprocating means to prevent the movement of the latter when the clutch is in operative position.

27. In a power-transmission mechanism, the combination with a frame having ways thereon, a driven member comprising a gear-wheel, a slide mounted in the ways and a device for reciprocating it, of a carrier movably supported on the slide, arbors mounted on the carrier and pinions secured to the arbors and adapted to coöperate with the gear-wheel and means for adjusting the carrier, a driving member and a movable clutch member thereon and a clutch-operating lever, of a locking-pin connected to said lever and coöperating with the slide-reciprocating device.

28. In a power-transmission mechanism, the combination with a frame having ways thereon, a driven member comprising a gear-wheel, a slide mounted in the ways having a cam-slot therein, a longitudinally-movable bar guided on the frame having a projection engaging said slot, and means for operating the bar, of a carrier movably supported on the slide, arbors mounted on the carrier and pinions secured to the arbors and adapted to coöperate with the gear-wheel and devices for adjusting the carrier, a driving member and means for connecting it to the arbors.

29. In a power-transmission mechanism, the combination with a frame having ways thereon, a driven member comprising a gear-wheel, a slide mounted in the ways and a device for reciprocating it, of a rock-shaft journaled on the slide, means for oscillating it, a carrier attached to the shaft and arbors supported thereon, pinions secured to the arbors and adapted to coöperate with the gear-wheel, a driving member and means for connecting it to the arbors.

30. In a power-transmission mechanism, the combination with a frame, a driven member comprising a bevel gear-wheel, said frame having ways thereon extending at right angles to the pitch-line of said gear-wheel, a slide mounted in the ways and means for reciprocating it, of a carrier journaled on the slide, arbors supported on the carrier and pinions secured to the arbors and adapted to coöperate with the gear-wheel and devices for adjusting the carrier, a driving member and means for connecting it to the arbors.

31. In a power-transmission mechanism, the combination with a frame, a driven member comprising a plurality of bevel gear-wheels of different pitch, said frame having ways thereon arranged in front of the faces of the several gear-wheels, and a reciprocatory slide guided in the ways, of a carrier journaled on the slide, arbors journaled thereon and a pinion secured to each arbor and adapted to coöperate with one of the bevel gear-wheels, devices for retracting the slide and separate devices for subsequently operating the carrier, a driving member and means for connecting it to the arbors.

32. In a power-transmission mechanism, the combination with a driven member comprising a face-plate, a plurality of bevel gear-rings arranged concentrically thereon and a driving member, of a plurality of connecting elements corresponding to the several rings adapted to coöperate separately with the driving member, means for adjusting said elements to position one of them in engagement with its respective ring and means for connecting said elements to the driving member.

33. In a power-transmission mechanism, the combination with a driven member comprising a face-plate, a plurality of rings of different diameters arranged concentrically thereon, said rings being provided with bevel-teeth of different pitch and a single driving member, of a plurality of connecting elements corresponding to the several rings and adapted to coöperate separately with the driving and driven members, means for adjusting said elements to position one or another of them in operative engagement with its respective gear-ring and means for connecting said element to the driving member.

ALBERT VERNON HART.

Witnesses:
FLORENCE E. FRANCK.
G. WILLARD RICH.